(12) United States Patent
Yao et al.

(10) Patent No.: US 9,311,177 B2
(45) Date of Patent: Apr. 12, 2016

(54) MECHANISM TO SUPPORT RELIABILITY, AVAILABILITY, AND SERVICEABILITY (RAS) FLOWS IN A PEER MONITOR

(71) Applicants: Jiewen Yao, Shanghai (CN); Vincent Zimmer, Federal Way, WA (US)

(72) Inventors: Jiewen Yao, Shanghai (CN); Vincent Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,098

(22) PCT Filed: Mar. 7, 2013

(86) PCT No.: PCT/CN2013/072294
§ 371 (c)(1),
(2) Date: Jun. 28, 2013

(87) PCT Pub. No.: WO2014/134808
PCT Pub. Date: Sep. 12, 2014

(65) Prior Publication Data
US 2015/0186322 A1 Jul. 2, 2015

(51) Int. Cl.
G06F 11/00 (2006.01)
G06F 11/07 (2006.01)
G06F 21/00 (2013.01)
G06F 9/44 (2006.01)
G06F 9/54 (2006.01)
G06F 13/40 (2006.01)
G11C 29/08 (2006.01)
G06F 9/52 (2006.01)

(52) U.S. Cl.
CPC .......... *G06F 11/0793* (2013.01); *G06F 9/4406* (2013.01); *G06F 9/52* (2013.01); *G06F 9/542* (2013.01); *G06F 11/00* (2013.01); *G06F 11/073* (2013.01); *G06F 13/4081* (2013.01); *G06F 21/00* (2013.01); *G11C 29/08* (2013.01)

(58) Field of Classification Search
CPC ... G06F 11/00; G06F 11/008; G06F 11/0712; G06F 11/10; G06F 11/301; G06F 13/4081; G06F 9/4406; G06F 9/542; G06F 21/00; G11C 29/08
USPC .................................. 714/42, 10, 13, 6.1, 39
See application file for complete search history.

(56) References Cited

U.S. PATENT DOCUMENTS

| 7,117,311 | B1 | 10/2006 | Rankin et al. | |
|---|---|---|---|---|
| 7,447,943 | B2 | 11/2008 | Vu et al. | |
| 2005/0138370 | A1* | 6/2005 | Goud et al. | 713/164 |

(Continued)

OTHER PUBLICATIONS

International Search Report for and Written Opinion of the International Searching Authority for International Patent Application No. PCT/CN2013/072294 mailed Nov. 21, 2013.

(Continued)

*Primary Examiner* — Joseph D Manoskey
(74) *Attorney, Agent, or Firm* — Lowenstein Sandler LLP

(57) ABSTRACT

A mechanism to support reliability, availability, and serviceability (RAS) flows in a peer monitor is disclosed. A method of the disclosure includes receiving, by a processing device, a system management interrupt (SMI) event. The method further includes invoking, in response to the SMI event, a privilege manager to execute from a read-only memory (ROM) entry point to handle the SMI event, the privilege manager comprising a hot plug service module to provide support for memory hot plug functionality and processor hot plug functionality.

20 Claims, 9 Drawing Sheets

(56) References Cited

U.S. PATENT DOCUMENTS

| | | |
|---|---|---|
| 2006/0085580 A1* | 4/2006 | Gupta et al. ............... 710/260 |
| 2006/0294149 A1 | 12/2006 | Seshadri et al. |
| 2008/0115138 A1* | 5/2008 | Nachimuthu et al. ....... 718/102 |
| 2008/0163209 A1 | 7/2008 | Rozas et al. |
| 2009/0119748 A1 | 5/2009 | Yao et al. |
| 2010/0262743 A1* | 10/2010 | Zimmer et al. ............. 710/267 |
| 2010/0287290 A1* | 11/2010 | Bramley et al. ............. 709/229 |
| 2014/0068605 A1* | 3/2014 | Tsirkin et al. ................. 718/1 |

OTHER PUBLICATIONS

International Search Report and Written Opinion received for PCT Patent Application No. PCT/CN2013/072294 mailed on Nov. 21, 2013, 10 pages.

\* cited by examiner

MECHANISM TO SUPPORT RELIABILITY, AVAILABILITY, AND SERVICEABILITY (RAS) FLOWS IN A PEER MONITOR

TECHNICAL FIELD

The embodiments of the disclosure relate generally to computer security and, more specifically, relate to a mechanism to support reliability, availability, and serviceability (RAS) flows in a peer monitor.

BACKGROUND

SMM is a mode of operation where all normal execution (including the OS) is suspended, and special separate software (usually firmware or a hardware-assisted debugger) is executed in a high-privilege mode. SMM provides an isolated memory and execution environment, and SMM code is invisible to the OS while retaining full access to host physical memory and complete control over peripheral hardware. When SMM is initiated, the current state of the processor is saved and all other processes are stopped. High privileged operations may be performed in SMM mode, such as debugging, hardware management, security functions, emulation, etc., followed by the computing device resuming operation based on the save state of the processor. Upon occurrence of an SMI, the computing device may enter the SMM.

Vulnerabilities in SMM code implementations have led to the introduction of some current security schemes in computing devices, where software critical to device operation is protected through segregation. For example, in a virtual machine (VM) environment, such as, for example, Virtualization Technology (VT) functionality incorporated on some processing devices, one or more machine managers may control VMs operating in different operational environments. For example, VT defines a primary monitor mode where virtual machine managers (VMM) (also known as hypervisors) are able to de-privilege guest operating systems (OS). Similarly, VT also provides a system management mode transfer monitor (STM) that can de-privilege a System Management Interrupt (SMI) handler, such that the SMI handler runs as a guest of the STM in system management mode (SMM).

However, current implementations of the STM lack support for reliability, availability, and serviceability (RAS). RAS is a set of related attributes used to describe a multitude of features that protect data integrity and enable a computer system to stay available for long periods of time without failure. RAS attributes may be considered when designing, manufacturing, purchasing, or using a computer product or component. Current STM implementations do not meet RAS requirements when supporting hot plug, read-only memory (ROM) SMI handler feature, and other RAS actions.

For example, in the case of hot plug support, current STM implementations do not provide for CPU or memory hot plug support. In the case of ROM SMI handler feature support, current STM implementations only support STM on dynamic random access memory (DRAM).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide for a mechanism to support reliability, availability, and serviceability (RAS) flows in a peer monitor. In one embodiment, a RAS-capable high privilege (HP) manager acts as a peer monitor, such as a System Management Interrupt (SMI) Transfer Monitor (STM). The STM may de-privilege an SMI handler, so that the SMI handler runs as a guest of the STM in system management mode (SMM). Because current implementations of the STM lack support for RAS flows, embodiments of the disclosure implement a RAS-capable HP manager that is configured to support features of RAS. In particular, the RAS-capable HP manager, such as an STM, may implement ROM-based execution and support for hot plug functionality.

In one embodiment, a method of the disclosure includes receiving, by a processing device, a system management interrupt (SMI) event. The method further includes invoking, in response to the SMI event, a privilege manager to execute from a read-only memory (ROM) entry point to handle the SMI event, the privilege manager comprising a hot plug service module to provide support for memory hot plug functionality and processor hot plug functionality.

Figure 1:
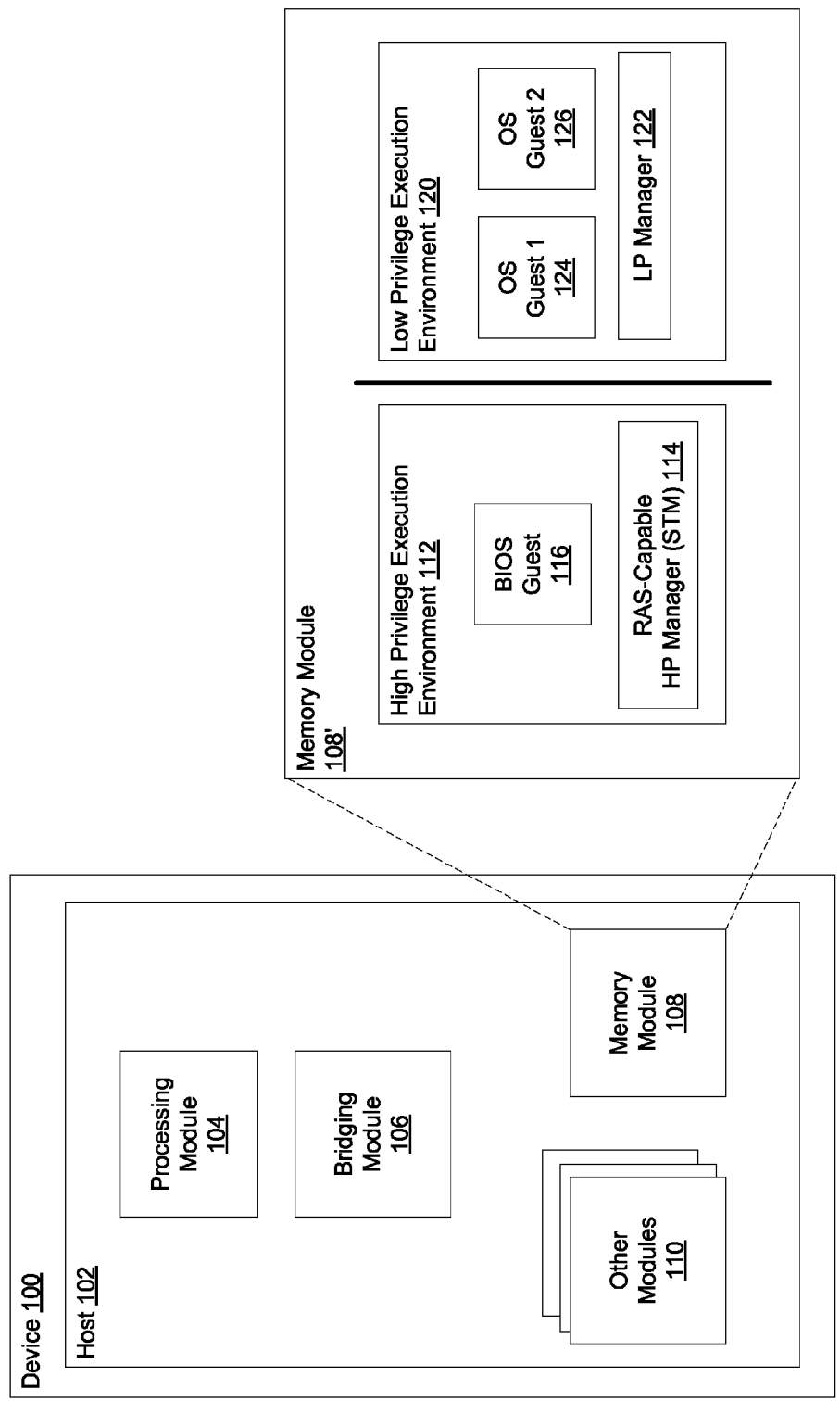
FIG. 1 is a block diagram of a device supporting Reliability, Availability, Serviceability (RAS) flows in a peer monitor according to an embodiment of the disclosure.

FIG. 1 is a block diagram of a device 100 supporting RAS flows in a peer monitor according to an embodiment of the disclosure. Some examples of device 100 may include, but are not limited to, a mobile communications device such as a cellular handset or smart phone, a mobile computing device such as a tablet computer, a netbook, a notebook computer, a laptop computer, a desktop computer, a server computer, and so on.

Device 100 may include, for example, host 102 to handle baseline operations for device 100. Host 102 may include, for example, a processing module 104, bridging module 106, memory module 108, and other modules 110. Processing module 102 may comprise one or more processors (also known as processing devices) situated in separate component, or alternatively, one or more processing cores embodied in a single integrated circuit (IC) arranged, for example, in a System-on-a-Chip (SOC) configuration.

Bridging module 106 may include circuitry configured to support processing module 104. Example circuitry may include interface/bridging circuitry (e.g., a group of integrated circuits (ICs)) that may be configured to handle communications using various buses in device 100. For example, bridging module 106 may handle signaling between the various modules by converting from one type/speed of communication to another, and may also be compatible with a variety of different devices to allow for different system implementations, upgrades, etc. Some of the functionality of bridging module 106 may also be incorporated into processing module 104, memory module 108, or other modules 110.

Processing module 104 may execute instructions. Instructions may include program code to cause processing module 104 to perform activities such as, but not limited to, reading data, writing data, processing data, formulating data, converting data, transforming data, etc. Information, including instructions, data, etc. may be stored in memory module 108.

Memory module 108 may include random access memory (RAM) or read-only memory (ROM) in a fixed or removable format. RAM may include memory to hold information during the operation of the device 100 such as, for example, static RAM (SRAM) or dynamic RAM (DRAM). ROM may include memories such as computing device BIOS memory to provide instructions when device 100 activates, programmable memories such as electronic programmable ROMs (EPROMs), Flash, etc. Other fixed and/or removable memory may include magnetic memories such as floppy disks, hard drives, etc., electronic memories such as solid state Flash memory (e.g., eMMC, etc.), removable memory cards or sticks (E.g., USB, micro-SD, etc.), optical memories such as compact disc-based ROM (CD-ROM), holographic, etc.

Other modules 110 may include modules directed to supporting other functionality within device 100. Other modules 110 may include, for example, modules to supply power to device 100, modules to support wired and/or wireless communications in device 100, modules to provider user interface (UI) features in device 100, modules to support specialized functionality, and so on. The composition of other modules 100 may be variable depending upon, for example, form factor, the use for which device 100 has been configured, and so on.

An embodiment of memory module 108 according to an embodiment of the disclosure is shown in a blown-up view at 108'. Memory module 108' may include a high privilege execution environment 112 and a low privilege execution environment 120. Software running in high privilege execution environment 112 may be able to affect the operation of other software in device 100 (e.g., may be able to read, write, and/or execute software in low privilege execution environment 120), but software running in low privilege execution environment 120 cannot affect any software running in high privilege execution environment 112. High privilege execution environment 112 may include a Reliability, Availability, Serviceability (RAS)-capable high privilege (HP) manager 114 to manage the operations of BIOS guest 116 and other guests 118. Low privilege execution environment 120 may include a low privilege (LP) manager 122 to manage the operations of OS guest 1 124 and OS guest 2 126. While two OS guests 124, 126 are shown, embodiments consistent with the disclosure are not limited to only two guests.

In at least one embodiment, certain activities in high privilege execution environment 112 may occur when device 100 enters a particular security mode. In this security mode, all other processing activity may be discontinued in processing module 104, the current context of processing module 104 may be saved, and then any operations related to high privilege execution environment 112 may be carried out prior to returning to normal operation of device 100. This security mode may be configured by RAS-capable HP manager 114.

Figure 2:
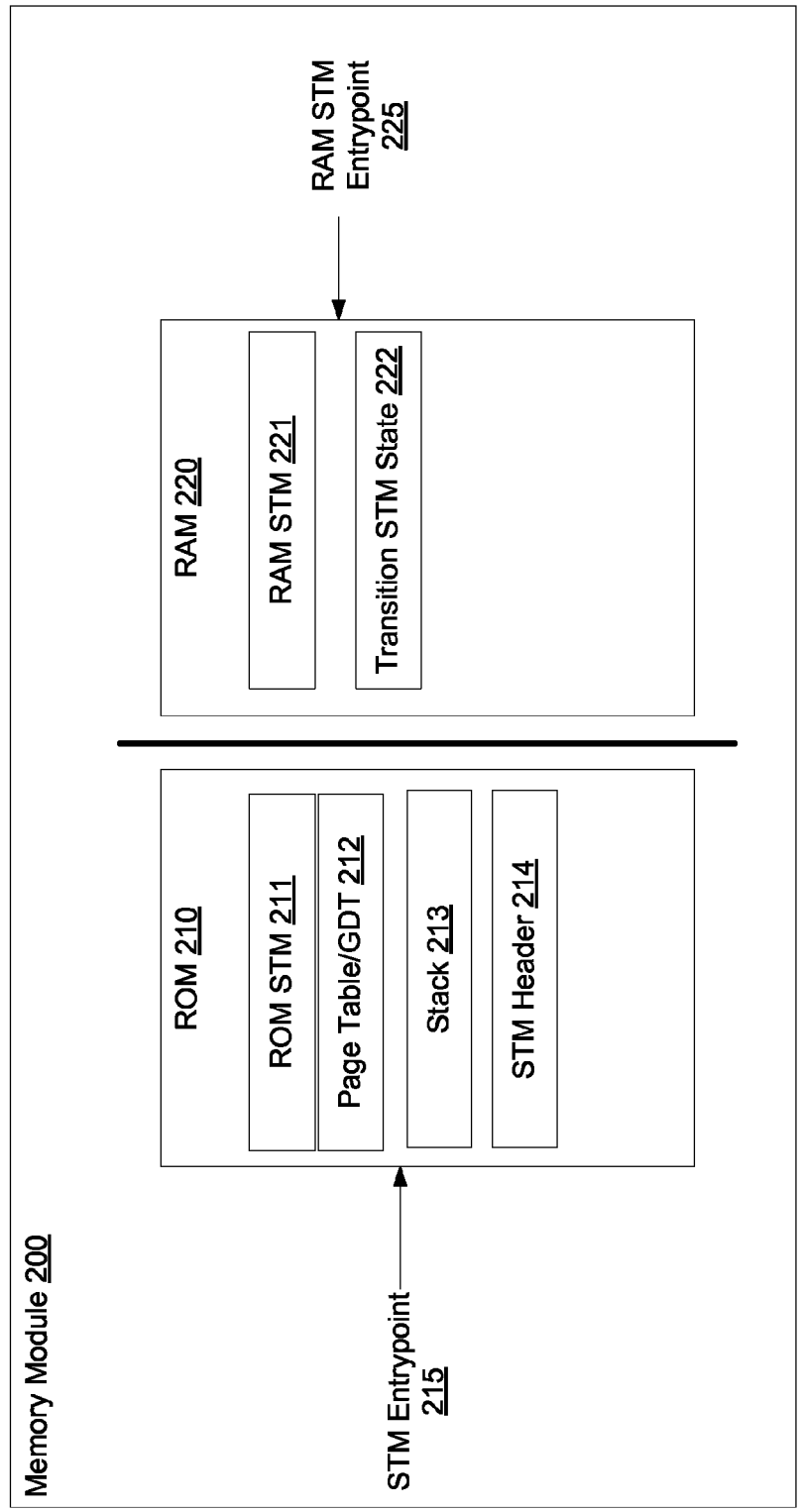
FIG. 2 is a block diagram illustrating a memory module to implement ROM-based execution of a peer monitor according to an embodiment of the disclosure.
Figure 4:
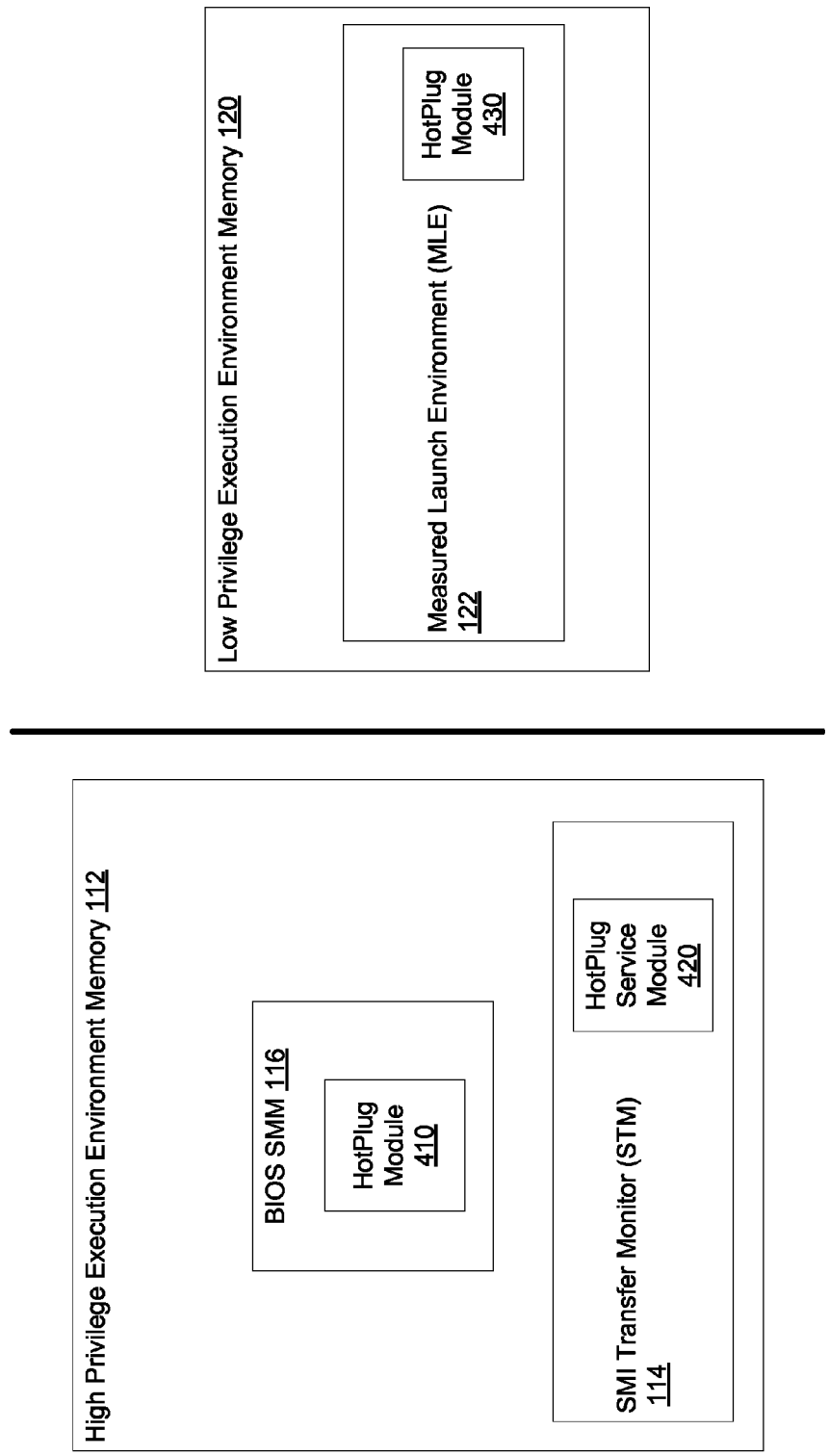
FIG. 4 is a block diagram illustrating hot plug support for RAS by a peer monitor in accordance with embodiments of the disclosure.

In embodiments of the disclosure, the RAS-capable HP manager 114 may be a peer monitor, such as a System Management Interrupt (SMI) Transfer Monitor (STM). The STM 114 may de-privilege a System Management Interrupt (SMI) handler, so that the SMI handler runs as a guest of the STM 114 in system management mode (SMM). Embodiments of the disclosure provide an STM 114 that is considered RAS-capable because it supports features of RAS. In particular, the RAS-capable HP manager 114 may implement ROM-based execution of the STM 114 and STM 114 support for hot plug functionality. Hot plug describes the functions of replacing or adding computer system components without shutting down or rebooting the system. FIGS. 2 and 4 provide further detail of the RAS features of ROM-based execution and hot plug that are supported by STM 114 in embodiments of the disclosure.

FIG. 2 is a block diagram illustrating a memory module 200 to implement ROM-based execution of a peer monitor according to an embodiment of the disclosure. In one embodiment, the memory module 200 is the same as memory module 108 described with respect to FIG. 1. In another embodiment, the peer monitor is an STM, such as STM 114 described with respect to FIG. 1. Memory module 200 may include both a ROM 210 region and a RAM 220 region.

Embodiments of the disclosure place an STM image 211 in ROM 210. In addition, an STM page table and global description table (GDT) 212 are created and placed in ROM 210 with the STM image 211. The STM page table and the STM GDT 212 enable the STM image 211 to be run in long mode (e.g., x64 bit mode). In one embodiment, the access bit and dirty bit for the STM page table and GDT 212 are set by default. ROM STM 211 may also include an STM header 214 that stores the page table and GDT 212 for ROM STM 211.

In one embodiment, the ROM STM may be initialized during a boot-up process of the BIOS of the computer system. A BIOS SMM module (not shown) may place an address of the ROM STM image 211 in a special register of a processor running the BIOS and STM code. This ROM STM image 211 address is the entry point 215 for the ROM STM image 211, where a stack 213 for the STM code is set up for execution of the STM code. In one embodiment, the special register storing the ROM STM entry point 215 is an IA32_SMM_MONITOR MSR.

At runtime, when a SMI occurs, the processor may invoke the ROM STM entry point 215 first (using the address at the special register). The ROM STM 211 may then check whether a memory error occurs at the RAM 220 region of the memory module 200. If the memory check reveals that there are no errors in RAM 220, then operation of the STM code may transfer to RAM STM 221 by invoking a RAM STM entry point 225. In one embodiment, the RAM STM entry point 225 is stored in the ROM STM 211. In one embodiment, the RAM STM 221 resides in a region of RAM 220 that the STM code typically resides, such as in a monitor segment (MSEG) region of a top segment (TSEG) of RAM 220.

On the other hand, if the ROM STM 211 detects that there is a RAM error, then the ROM STM 211 cannot invoke the RAM STM 221. Instead, ROM STM 211 can call a BIOS ROM SMM handler directly to handle the corrupt RAM 220 or handle the error otherwise (according to BIOS SMM handler choice). In one embodiment, an entry point for the BIOS ROM SMM handler may be defined in another special register, such as a TXT DESC SMM SAVE STATE MSR.

In embodiments of the disclosure, an STM transition state data structure 222 is used to transition between the ROM STM 211 and the RAM STM 221. In one embodiment, the STM transition state data structure 222 is included at the beginning of a MSEG portion of RAM 220. During initialization of a system having the memory module 200, a BIOS SMM may determine a state of the ROM STM 211 and a state of the RAM STM 221. The transition data structure may include, but is not limited to, the size of the ROM STM, the size of the RAM STM, a CRC, check, hash or other cryptographic marker. The transition data structure may be utilized by the ROM STM 211 to verify the integrity of the RAM STM prior to passing control.

The ROM-based STM execution described above makes it possible to handle memory errors during runtime, which is a RAS feature. It allows for the early flows of an STM to be pushed onto ROM, to address a scenario where the RAM STM, or any other portion of RAM, is corrupted.

Figure 3:
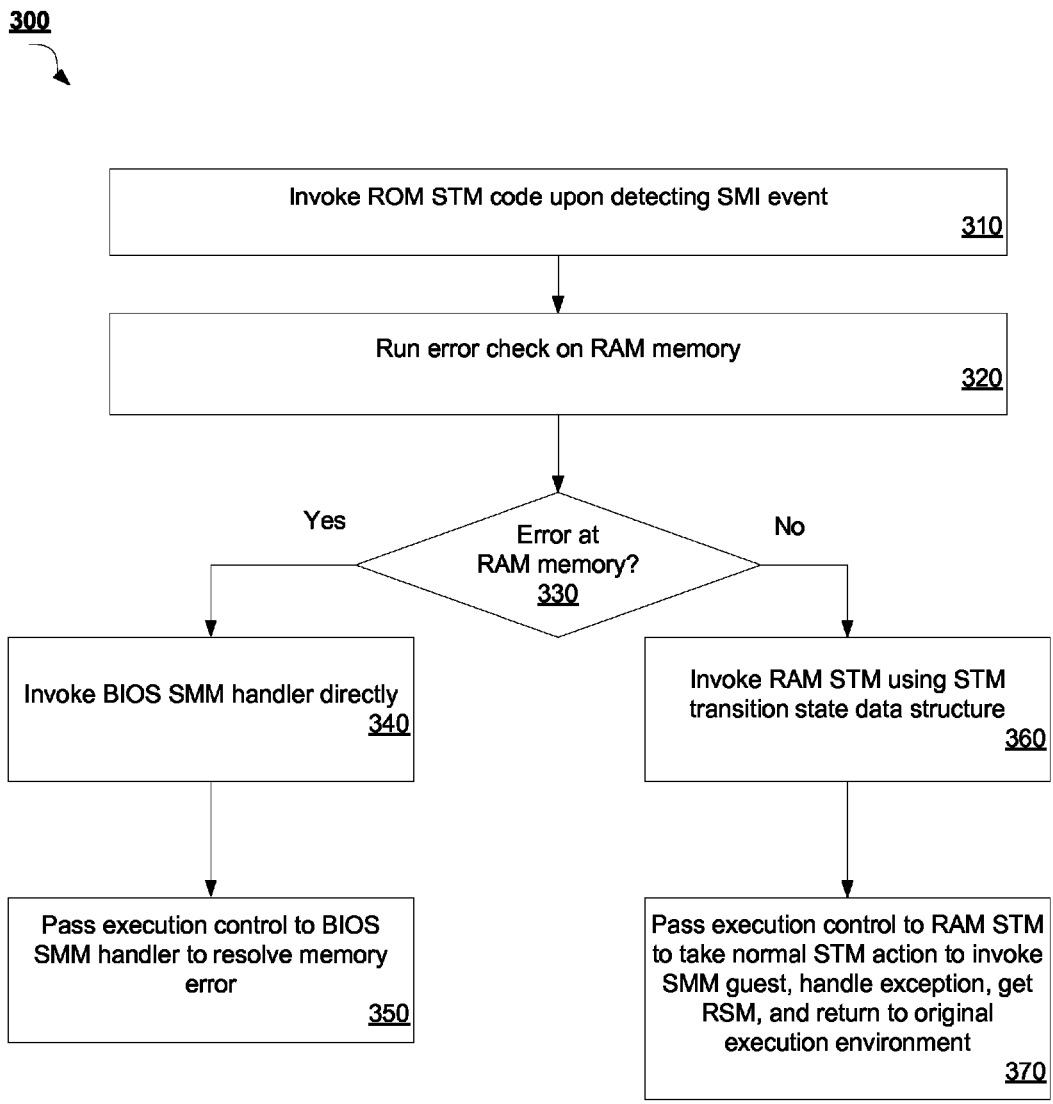
FIG. 3 is a flow diagrams of a method for Read-Only Memory (ROM)-based execution of a peer monitor to support RAS according to an embodiment of the disclosure.

FIG. 3 is a flow diagram of a method 300 for ROM-based execution of a peer monitor to support RAS according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by device 100 described with respect to FIG. 1.

Method 300 begins at block 310, where STM code in a ROM region is invoked upon detecting an SMI event. In one embodiment, a processor detects the SMI event and invokes the ROM STM code based on an address for an entry point of the ROM STM stored in a register of the processor. Then, at block 320, the ROM STM code runs an error check on RAM memory. At decision block 330, it is determined whether there was an error at the RAM memory.

If there is a RAM error at decision block 330 and the memory in error does not fall within the region of the OEM SMM code, then method 300 proceeds to block 340 where BIOS SMM handler is invoked directly from the ROM STM code. In one embodiment, an entry point address for the BIOS SMM handler may be stored in a register of the processor and used by the ROM STM to invoke the BIOS SMM handler. At block 350, execution control is passed from the ROM STM code to the BIOS SMM handler in order for the BIOS SMM handler to resolve the memory error in RAM.

If, at decision block 330, there is a RAM memory error and the memory overlaps the OEM SMRAM, then the STM can setup a machine check log with information of the memory location. The firmware may then return to the host environment by injecting a machine check abort and/or reset the machine. In either case, an OS agent can ascertain the error information from the machine check log.

If there are no RAM errors detected at decision block 330, then method 300 proceeds to block 360 where RAM STM code is invoked from the ROM STM code. In one embodiment, an STM transition data structure is used to transition from the ROM STM to the RAM STM. The ROM STM may use the transition structure to pass control and also to ascertain if the ROM STM overlaps the memory range where the memory error has been reported. Then, at block 370, execution control is passed from the ROM STM to the RAM STM in order for the RAM STM to take normal STM action to invoke an SMM guest, handle the exception from the SMI event, get Resume from System Management Mode (RSM), and return to original execution environment.

FIG. 4 is a block diagram illustrating hot plug support for RAS by a peer monitor in accordance with embodiments of the disclosure. Some of the embodiments discussed herein may be described using terminology associated with virtualization technology (VT) currently available in many microprocessors. VT is functionality allowing more than one virtual machine (VM) to simultaneously share access to physical processing resources in a safe and efficient manner. However, use of these terms is for the sake of explanation herein, and implementations consistent with the disclosure are not limited to using this technology. For example, other hardware (e.g., microprocessors) and/or software offering similar features may also be employed in a manner consistent with the various embodiments as disclosed herein.

In the example implementation of FIG. 4, high privilege execution environment memory 112, STM 114, BIOS guest 116, and low privilege execution environment memory 120 are the same as their identically-numbered counterparts from FIG. 1. STM is configured to manage the operation of BIOS SMM guest 116. In one embodiment, LP manager 122 from FIG. 1 is illustrated as Measured Launch Environment (MLE) 122 of low privilege execution environment memory 120. STM 114 communicates with BIOS SMM 116 and MLE 122 using a variety of different VMCALL commands, and vice versa. A VMCALL command may include an instruction between a hypervisor and a guest, or between two different hypervisors. In some embodiments, a VMCall is a mechanism that a virtual machine guest, such as the MLE or the BIOS SMM, can use to communicate with to a hypervisor, such as the STM.

In one embodiment, a hot plug service module 420 is added to the STM 114 to define a set of extensions to Application Programming Interfaces (APIs) to support hot plug functionality for RAS-capable STM. The hot plug service module 420 may communicate with corresponding hot plug modules 410, 430 in the BIOS SMM 116 and the MLE 122.

Figure 5A:
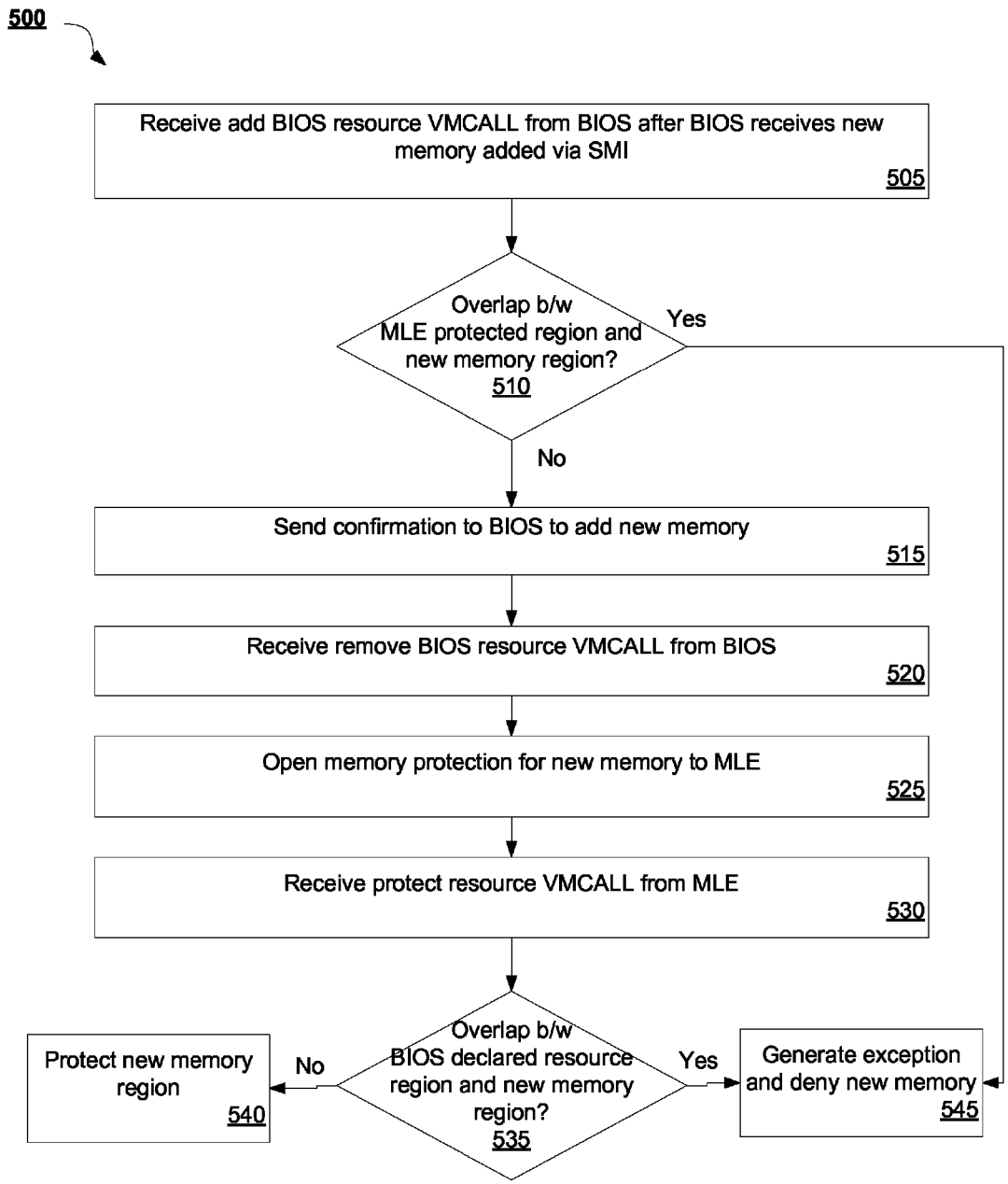
FIGS. 5A and 5B are flow diagrams illustrating methods for hot plug support by an STM when adding or removing memory according to an embodiment of the disclosure.
Figure 5B:
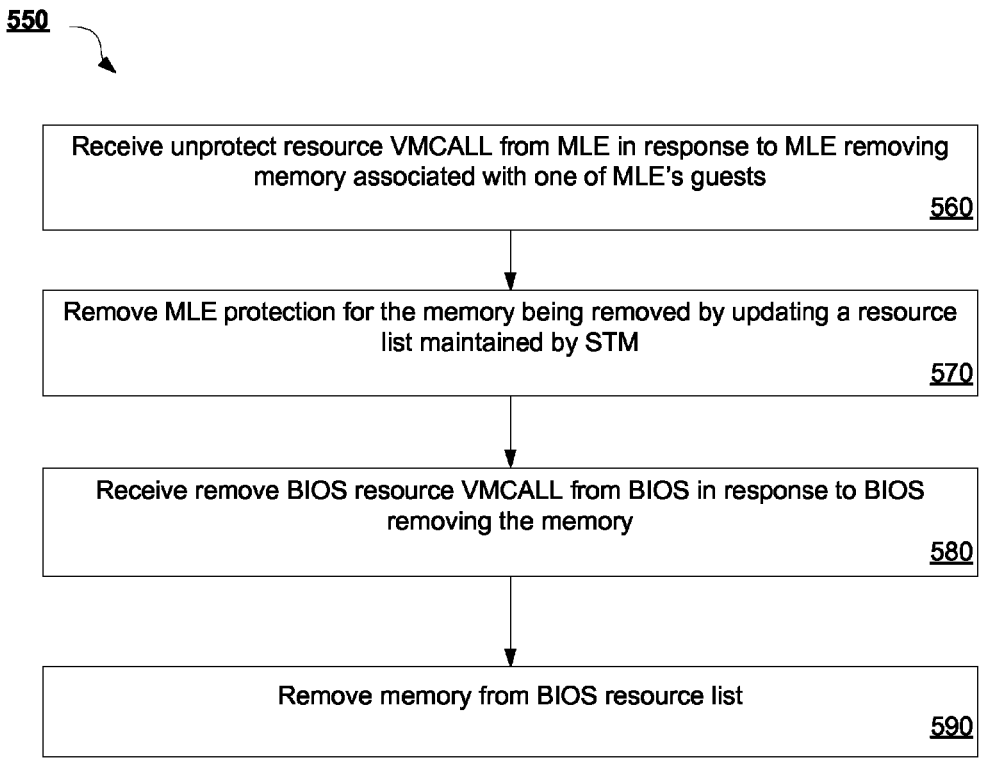

In one embodiment, the hot plug service module 420 provides support for memory hot plug operations and processor hot plug operations. With respect to memory hot plug, two new BIOS-to-STM VMCALL commands are introduced, an add BIOS resource VMCALL and a remove BIOS resource VMCALL. Although the description herein specifically refers to an add BIOS resource VMCALL and a remove BIOS resource VMCALL, other identifications of such instructions may be used and embodiments of the disclosure are not limited to the specific names used herein. FIGS. 5A and 5B below describe example flows for adding and removing memory using hot plug support via STM according to embodiments of the disclosure.

Figure 6A:
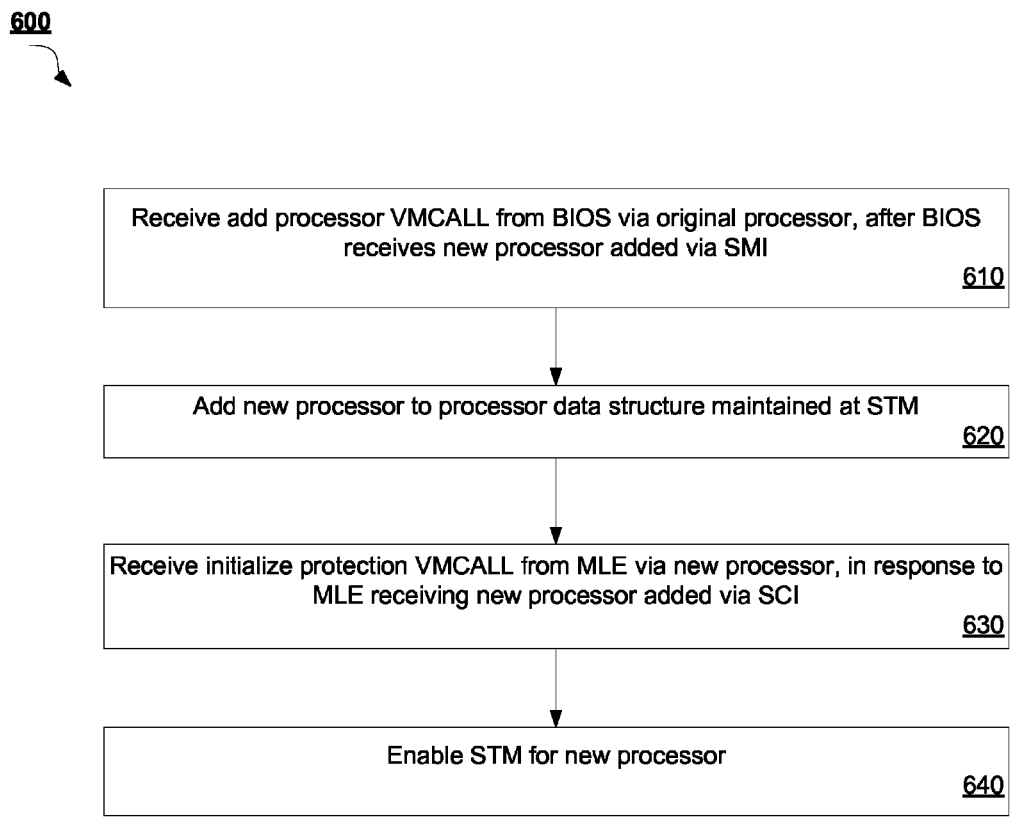
FIGS. 6A and 6B are flow diagrams illustrating a method for hot plug support by an STM when adding or removing processors according to an embodiment of the disclosure.
Figure 6B:
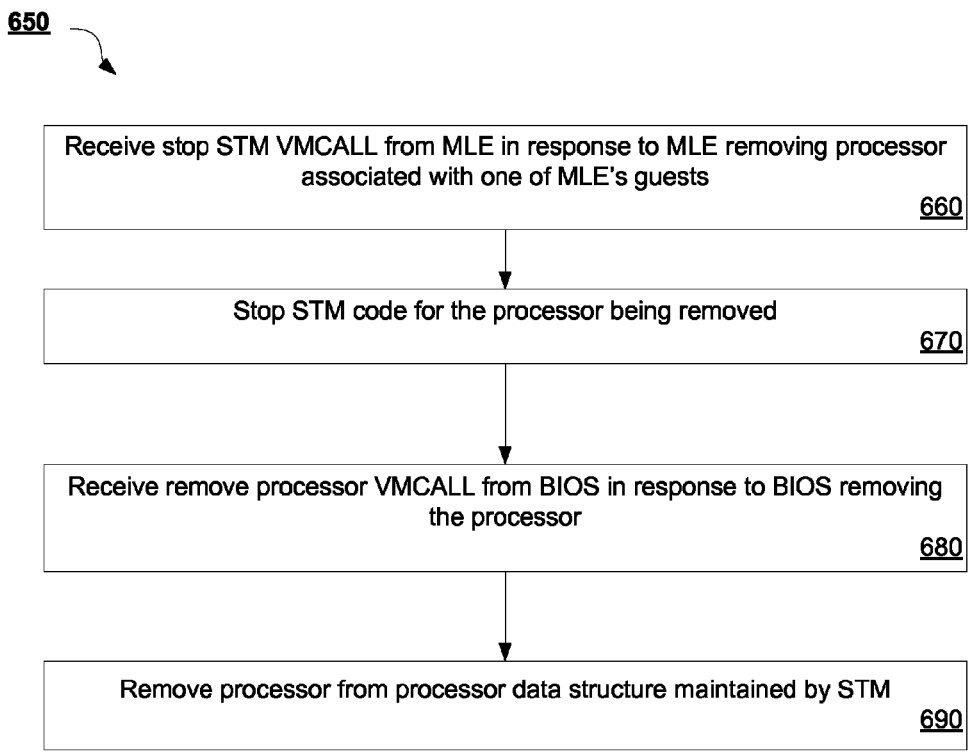

With respect to processor hot plug, two new BIOS-to-STM VMCALL commands are introduced, an add processor VMCALL and a remove processor VMCALL. Although the description herein specifically refers to an add processor VMCALL and a remove processor VMCALL, other identifications of such instructions may be used and embodiments of the disclosure are not limited to the specific names used herein. FIGS. 6A and 6B below describe example flows for adding and removing processors using hot plug support via STM according to embodiments of the disclosure.

FIG. 5A is a flow diagram of a method 500 for hot plug support by an STM when adding memory to a computer system according to an embodiment of the disclosure. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by STM 114 described with respect to FIG. 4.

Method 500 begins at block 505, where an add BIOS resource VMCALL is received at an STM from BIOS. In one embodiment, the add BIOS resource VMCALL is received after the BIOS receives notification of new memory being added via an SMI event. At decision block 510, the STM determines whether there is any overlap between an MLE-protected region of memory and a region of memory that the new memory would be associated with. In one embodiment, the STM maintains a list of resources claimed by the BIOS and by the MLE, and can cross-check this list for the overlap determination at decision block 510. If there is an overlap detected at decision block 510, then the STM generates and exception and denies the addition of the new memory at block 545.

On the other hand, if no overlap is detected at decision block 510, the method 500 proceeds to block 515 where the STM sends a confirmation to BIOS to add the new memory. Then, at block 520 the STM receives a remove BIOS resource VMCALL from the BIOS. This may be in response to the BIOS temporarily accessing the new memory after the STM confirmed to BIOS that there was no overlap.

At block 525, in response to the remove BIOS resource VMCALL, the STM opens memory protection for the new memory to the MLE. In one embodiment, once the memory protection for the new memory is opened to the MLE, the MLE may then receive the new memory added via a System Control Interrupt (SCI) event. At block 530, the STM receives a protect resource VMCALL from the MLE. In response, the STM, at decision block 535, determines whether there is an overlap between a BIOS-declared resource region and a memory of region associated with the new memory.

If an overlap is detected, then method 500 proceeds to block 545 where an exception is generated by the STM and the addition of the new memory is denied. On the other hand, if no overlap is detected, then the new memory region is protected by the STM for the MLE at block 540. In one embodiment, the new memory resource is added to the list of MLE resource maintained by the STM. The MLE may then inject a virtual SCI to a guest adding the new memory, so that the guest may use the new memory.

FIG. 5B is a flow diagram of a method 550 for hot plug support by an STM when removing memory to a computer system according to an embodiment of the disclosure. Method 550 may be performed by processing logic that may comprise hardware (e.g., circuitry, dedicated logic, programmable logic, microcode, etc.), software (such as instructions run on a processing device), firmware, or a combination thereof. In one embodiment, method 550 is performed by STM 114 described with respect to FIG. 4.

Method 550 begins at block 560, where an STM receives an unprotect resource VMCALL from an MLE. In one embodiment, the unprotect resource VMCALL is sent by the MLE to the STM in response to the MLE removing memory associated with one of the MLE's guests. The guest may remove the memory, which generates a remove memory request to the BIOS via an SMI. In turn, the BIOS may trigger an SCI to notify the MLE, and the MLE may inject a virtual SCI to the guest so that the guest removes the memory. Once the memory is removed, the MLE may invoke the unprotect resource VMCALL to the STM at block 560.

Subsequently, at block 570, the STM removes MLE protection for the memory in a list (or lists) maintained by the STM. The BIOS may then remove the memory and invoke a remove BIOS resource VMCALL, which is received by the STM at block 580. In response to the remove BIOS resource VMCALL, the STM removes the memory from a BIOS resource list maintained by the STM at block 590.

FIG. 6A is a flow diagram of a method 600 for hot plug support by an STM when adding a processor to a computer system according to an embodiment of the disclosure. Method 600 may be performed by processing logic that may comprise hardware (e.g., circuitry, dedicated logic, programmable logic, microcode, etc.), software (such as instructions run on a processing device), firmware, or a combination thereof. In one embodiment, method 600 is performed by STM 114 described with respect to FIG. 4.

Method 600 begins at block 610, where an add processor VMCALL is received from BIOS via an original processor already operating on the computing system. In one embodiment, the add processor VMCALL is received in response to the BIOS receiving an SMI event indicated a new processor is being added. At block 620, the STM adds the new processor to a list of BIOS resources maintained by the STM. In one embodiment, the list of BIOS resources includes a data structure, such as a linked list, detailing processors of the computing system.

At block 630, an initialize protection VMCALL is received by the STM from the MLE via the new processor. In one embodiment, the initialize protection VMCALL is received in response to the MLE receiving the new processor, which is added via an SCI event. At block 640, STM is enabled on the new processor by the STM. Once the STM is enabled for the new processor, the MLE may inject a virtual SCI to the guest adding the new processor so that the guest can use the processor.

FIG. 6B is a flow diagram of a method 650 for hot plug support by an STM when removing a processor to a computer system according to an embodiment of the disclosure. Method 650 may be performed by processing logic that may comprise hardware (e.g., circuitry, dedicated logic, programmable logic, microcode, etc.), software (such as instructions run on a processing device), firmware, or a combination thereof. In one embodiment, method 650 is performed by STM 114 described with respect to FIG. 4.

Method 650 begins at block 660, where an STM receives a stop STM VMCALL from an MLE. In one embodiment, the stop STM VMCALL is sent by the MLE to the STM in response to the MLE removing a processor associated with one of the MLE's guests. The guest may remove the processor, which generates a remove processor request to the BIOS via an SMI. In turn, the BIOS may trigger an SCI to notify the MLE, and the MLE may inject a virtual SCI to the guest so that the guest removes the processor. Once the processor is removed, the MLE may invoke the stop STM VMCALL to the STM at block 660.

Subsequently, at block 670, the STM stops STM services for the processor being removed in response to the stop STM VMCALL. The BIOS may then remove the processor and invoke a remove processor VMCALL, which is received by the STM at block 680. In response to the remove processor VMCALL, the STM removes the processor by destructing the data structure associated with the processor that is maintained by the STM at block 690.

Figure 7:
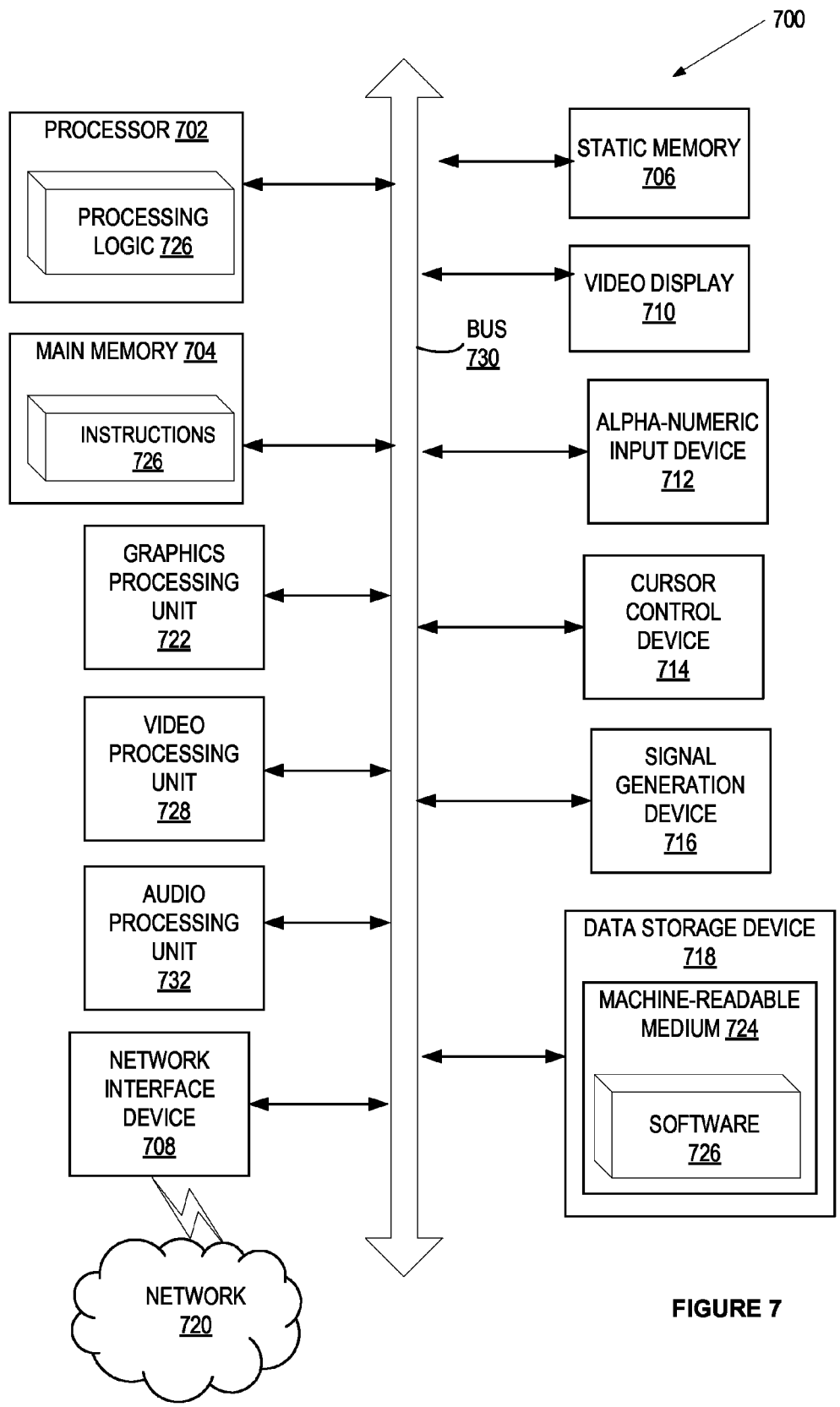
FIG. 7 illustrates a block diagram of one embodiment of a computer system.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. In one embodiment, processing device 702 may include one or processing cores. The processing device 702 is configured to execute the processing logic 726 for performing the operations and steps discussed herein. In one embodiment, processing device 702 is the same as processing device 100 described with respect to FIG. 1 that implements a RAS-capable HP manager, such as an STM. For example, processing device 702 may include a RAS-capable HP manager, such as STM 114 of FIG. 1.

The computer system 700 may further include a network interface device 708 communicably coupled to a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker). Furthermore, computer system 700 may include a graphics processing unit 722, a video processing unit 728, and an audio processing unit 732.

The data storage device 718 may include a machine-accessible storage medium 724 on which is stored software 726 implementing any one or more of the methodologies of functions described herein, such as implementing an RS with restricted entries as described above. The software 726 may also reside, completely or at least partially, within the main memory 704 as instructions 726 and/or within the processing device 702 as processing logic 726 during execution thereof by the computer system 700; the main memory 704 and the processing device 702 also constituting machine-accessible storage media.

The machine-readable storage medium 724 may also be used to store instructions 726 implementing a RAS-capable HP manager, such as described with respect to device 100 in FIG. 1, and/or a software library containing methods that call the above applications. While the machine-accessible storage medium 728 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments. Example 1 is a method for supporting reliability, availability, and serviceability (RAS) flows in a peer monitor comprising receiving, by a processing device, a system management interrupt (SMI) event, and invoking, by the processing device in response to the SMI event, a privilege manager to execute from a read-only memory (ROM) entry point to handle the SMI event, the privilege manager comprising a hot plug service module to provide support for memory hot plug functionality and processor hot plug functionality. In Example 2, the subject matter of Example 1 can optionally include the privilege manager comprising a system management interrupt (SMI) transfer monitor (STM). In Example 3, the subject matter of any one of Examples 1-2 can optionally include the privilege manager comprising a hypervisor executing system management mode (SMM) code of a basic input/output system (BIOS) as a guest of the privilege manager.

In Example 4, the subject matter of any one of Examples 1-3 can optionally include the privilege manager to execute an error check on read-access memory (RAM) subsequent to invocation. In Example 5, the subject matter of any one of Examples 1-4 can optionally include the privilege manager is to access a transition data structure to verify an integrity of the RAM for the error check. In Example 6, the subject matter of any one of Examples 1-5 can optionally include the transition data structure to maintain data comprising at least one of a size of the privilege manager in the ROM, a size of the privilege manager in the RAM, a cyclic redundancy check (CRC) value, a check value, a hash, or a cryptographic marker.

In Example 7, the subject matter of any one of Examples 1-6 can optionally include wherein when the error check indicates an error in the RAM, the privilege manager is to invoke a BIOS SMM handler to resolve the error in the RAM. In Example 8, the subject matter of any one of Example 1-6 can optionally include wherein when the error check indicates no error in the RAM, the privilege manager is to pass control to another version of the privilege manager executing in the RAM.

In Example 9, the subject matter of any one of Examples 1-8 can optionally include wherein the hot plug service module comprises a set of extensions to Application Programming Interfaces (APIs) to support hot plug functionality for memory, the extensions to the APIs comprising an add BIOS resource VMCALL and a remove BIOS resource VMCALL that are communicated between a basic input/output system (BIOS) and the privilege manager. In Example 10, the subject matter of any one of Examples 1-9 can optionally include wherein the hot plug service module comprises a set of extensions to Application Programming Interfaces (APIs) to support hot plug functionality for processor, the extensions to the APIs comprising an add processor VMCALL and a remove processor VMCALL that are communicated between a basic input/output system (BIOS) and the privilege manager.

Example 11 is an apparatus for supporting reliability, availability, and serviceability (RAS) flows in a peer monitor comprising a memory module comprising a privilege execution environment and a low privilege execution environment, and a processing device communicably coupled to the memory module. In Example 11, the processing device is to receive a system management interrupt (SMI) event, invoke, in response to the SMI event, a SMI transfer monitor (STM) to execute from a read-only memory (ROM) entry point to handle the SMI event, and provide, by the STM, support for memory hot plug functionality and processor hot plug functionality via a hot plug service module of the STM. In Example 12, the subject matter of Example 11 can optionally include wherein the STM to execute as a hypervisor and to virtualize system management mode (SMM) code of a basic input/output system (BIOS) of the apparatus as a guest of the STM.

In Example 13, the subject matter of any one of Examples 11-12 can optionally include wherein the STM to execute an error check on read-access memory (RAM) subsequent to invocation. In Example 14, the subject matter of any one of Examples 11-13 can optionally include wherein when the error check indicates an error in the RAM, the STM is to invoke a BIOS SMM handler to resolve the error in the RAM. In Example 15, the subject matter of any one of Examples 11-14 can optionally include wherein when the error check indicates no error in the RAM, the STM is to pass control to another version of the privilege manager executing in the RAM.

In Example 16, the subject matter of any one of Examples 11-15 can optionally include wherein the hot plug service module comprises a set of extensions to Application Programming Interfaces (APIs) to support the hot plug functionality for the memory, the extensions to the APIs comprising an add BIOS resource VMCALL and a remove BIOS resource VMCALL that are communicated between a basic input/output system (BIOS) and the STM.

In Example 17, the subject matter of any one of Examples 11-16 can optionally include wherein the hot plug service module comprises a set of extensions to Application Programming Interfaces (APIs) to support the hot plug functionality for the processor, the extensions to the APIs comprising an add processor VMCALL and a remove processor VMCALL that are communicated between a basic input/output system (BIOS) and the STM. All optional features of the apparatus described above may also be implemented with respect to the method or process described herein.

Example 18 is a non-transitory machine-readable storage medium for supporting reliability, availability, and serviceability (RAS) flows in a peer monitor. In Example 18, the non-transitory machine-readable medium includes data that, when accessed by a processing device, cause the processing device to perform operations comprising accessing, by a privilege manager executed by the processing device from a read-only memory (ROM) entry point, a transition data structure tracking an integrity of a read-access memory (RAM), the accessing in response to the processing device receiving a system management interrupt (SMI) event. In addition, in Example 18, the operations further comprise executing, by the privilege manager based on the transition data structure, an error check on the RAM, and when the error check indicates no error in the RAM, passing, by the privilege manager, control to another version of the privilege manager executing in the RAM to handle the SMI event, the privilege manager comprising a hot plug service module to provide support for memory hot plug functionality and processor hot plug functionality.

In Example 19, the subject matter of claim 18 can optionally include wherein the privilege manager is a system management interrupt (SMI) transfer monitor (STM) that executes as a hypervisor, and wherein the STM virtualizes system management mode (SMM) code of a basic input/output system (BIOS) as a guest of the STM. In Example 20, the subject matter of any one of Examples 18-19 can optionally include when the error check indicates an error in the RAM, invoking, by the privilege manager, a BIOS SMM handler to resolve the error in the RAM.

In Example 21, the subject matter of any one of Examples 18-20 can optionally include wherein the hot plug service module comprising a set of extensions to Application Programming Interfaces (APIs) to support hot plug functionality for memory, the extensions to the APIs comprising an add BIOS resource VMCALL and a remove BIOS resource VMCALL that are communicated between a basic input/output system (BIOS) and the privilege manager. In Example 22, the subject matter of any one of Examples 18-21 can optionally include wherein the hot plug service module comprising a set of extensions to Application Programming Interfaces (APIs) to support hot plug functionality for processor, the extensions to the APIs comprising an add processor VMCALL and a remove processor VMCALL that are communicated between a basic input/output system (BIOS) and the privilege manager.

Example 23 is an apparatus for supporting reliability, availability, and serviceability (RAS) flows in a peer monitor comprising means for accessing, via a read-only memory (ROM) entry point, a transition data structure tracking an integrity of a read-access memory (RAM), the accessing in response to receiving a system management interrupt (SMI) event. The apparatus of Example 23 further comprises means for executing, based on the transition data structure, an error check on the RAM, and when the error check indicates no error in the RAM, means for passing control to version of a privilege manager executing in the RAM to handle the SMI event, the means for accessing comprising a hot plug service module to provide support for memory hot plug functionality and processor hot plug functionality. In Example 24, the subject matter of Example 22 can optionally include the apparatus further configured to perform the method of any one of the claims 2 to 10.

Example 25 is at least one machine readable medium comprising a plurality of instructions that in response to being executed on a computing device, cause the computing device to carry out a method according to any one of Examples 1-10. Example 26 is an apparatus for supporting reliability, availability, and serviceability (RAS) flows in a peer monitor, configured to perform the method of any one of Examples 1-10. Example 27 is an apparatus comprising means for performing the method of any one of Examples 1-10. Specifics in the Examines may be used anywhere in one or more embodiments.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method for supporting reliability, availability, and serviceability (RAS) flows in a peer monitor, comprising:
   receiving, by a processing device, a system management interrupt (SMI) event; and
   invoking, by the processing device in response to the SMI event, a privilege manager to execute from a read-only memory (ROM) entry point to handle the SMI event, the privilege manager comprising a hot plug service module to provide support for memory hot plug functionality and processor hot plug functionality,
   wherein the privilege manager is to execute an error check on read-access memory (RAM) subsequent to invocation.

2. The method of claim 1, wherein the privilege manager is a system management interrupt (SMI) transfer monitor (STM).

3. The method of claim 1, wherein the privilege manager comprises a hypervisor executing system management mode (SMM) code of a basic input/output system (BIOS) as a guest of the privilege manager.

4. The method of claim 1, wherein the privilege manager is to access a transition data structure to verify an integrity of the RAM for the error check.

5. The method of claim 4, wherein the transition data structure maintains data comprising at least one of a size of the privilege manager in the ROM, a size of the privilege manager in the RAM, a cyclic redundancy check (CRC) value, a check value, a hash, or a cryptographic marker.

6. The method of claim 1, wherein when the error check indicates an error in the RAM, the privilege manager is to invoke a BIOS SMM handler to resolve the error in the RAM.

7. The method of claim 1, wherein when the error check indicates no error in the RAM, the privilege manager is to pass control to another version of the privilege manager executing in the RAM.

8. The method of claim 1, wherein the hot plug service module comprises a set of extensions to Application Programming Interfaces (APIs) to support hot plug functionality for memory, the extensions to the APIs comprising an add BIOS resource VMCALL and a remove BIOS resource VMCALL that are communicated between a basic input/output system (BIOS) and the privilege manager.

9. The method of claim 1, wherein the hot plug service module comprises a set of extensions to Application Programming Interfaces (APIs) to support hot plug functionality for processor, the extensions to the APIs comprising an add processor VMCALL and a remove processor VMCALL that are communicated between a basic input/output system (BIOS) and the privilege manager.

10. An apparatus for supporting reliability, availability, and serviceability (RAS) flows in a peer monitor, comprising:
    a memory module comprising a privilege execution environment and a low privilege execution environment; and
    a processing device communicably coupled to the memory module, the processing device to:
      receive a system management interrupt (SMI) event;
      invoke, in response to the SMI event, a SMI transfer monitor (STM) to execute from a read-only memory (ROM) entry point to handle the SMI event; and
      provide, by the STM, support for memory hot plug functionality and processor hot plug functionality via a hot plug service module of the STM,
      wherein the STM to execute an error check on read-access memory (RAM) subsequent to invocation.

11. The apparatus of claim 10, wherein the STM to execute as a hypervisor and to virtualize system management mode (SMM) code of a basic input/output system (BIOS) of the apparatus as a guest of the STM.

12. The apparatus of claim 10, wherein when the error check indicates an error in the RAM, the STM is to invoke a BIOS SMM handler to resolve the error in the RAM.

13. The apparatus of claim 10, wherein when the error check indicates no error in the RAM, the STM is to pass control to another version of the privilege manager executing in the RAM.

14. The apparatus of claim 10, wherein the hot plug service module comprises a set of extensions to Application Programming Interfaces (APIs) to support the hot plug functionality for the memory, the extensions to the APIs comprising an add BIOS resource VMCALL and a remove BIOS resource VMCALL that are communicated between a basic input/output system (BIOS) and the STM.

15. The apparatus of claim 10, wherein the hot plug service module comprises a set of extensions to Application Programming Interfaces (APIs) to support the hot plug functionality for the processor, the extensions to the APIs comprising an add processor VMCALL and a remove processor VMCALL that are communicated between a basic input/output system (BIOS) and the STM.

16. A non-transitory machine-readable storage medium including data that, when accessed by a processing device, cause the processing device to perform operations comprising:
    accessing, by a privilege manager executed by the processing device from a read-only memory (ROM) entry point, a transition data structure tracking an integrity of a read-access memory (RAM), the accessing in response to the processing device receiving a system management interrupt (SMI) event;
    executing, by the privilege manager based on the transition data structure, an error check on the RAM; and
    when the error check indicates no error in the RAM, passing, by the privilege manager, control to another version of the privilege manager executing in the RAM to handle the SMI event, the privilege manager comprising a hot plug service module to provide support for memory hot plug functionality and processor hot plug functionality.

17. The non-transitory machine-readable storage medium of claim 16, wherein the privilege manager is a system management interrupt (SMI) transfer monitor (STM) that executes as a hypervisor, and wherein the STM virtualizes system management mode (SMM) code of a basic input/output system (BIOS) as a guest of the STM.

18. The non-transitory machine-readable storage medium of claim 16, the operations further comprise, when the error check indicates an error in the RAM, invoking, by the privilege manager, a BIOS SMM handler to resolve the error in the RAM.

19. The non-transitory machine-readable storage medium of claim 16, wherein the hot plug service module comprising a set of extensions to Application Programming Interfaces (APIs) to support hot plug functionality for memory, the extensions to the APIs comprising an add BIOS resource VMCALL and a remove BIOS resource VMCALL that are communicated between a basic input/output system (BIOS) and the privilege manager.

20. The non-transitory machine-readable storage medium of claim 16, wherein the hot plug service module comprising a set of extensions to Application Programming Interfaces (APIs) to support hot plug functionality for processor, the extensions to the APIs comprising an add processor VMCALL and a remove processor VMCALL that are communicated between a basic input/output system (BIOS) and the privilege manager.

* * * * *